TWO-WAY COMMUNICATION SYSTEM

Filed July 9, 1948 2 Sheets-Sheet 1

INVENTOR.
LOUIS PRAHM
BY Karl F. Ross
AGENT

March 6, 1951 L. PRAHM 2,543,986

TWO-WAY COMMUNICATION SYSTEM

Filed July 9, 1948 2 Sheets-Sheet 2

INVENTOR.
LOUIS PRAHM
BY Karl F. Ross
AGENT

Patented Mar. 6, 1951

2,543,986

UNITED STATES PATENT OFFICE 2,543,986

TWO-WAY COMMUNICATION SYSTEM

Louis Prahm, New York, N. Y.

Application July 9, 1948, Serial No. 37,789

13 Claims. (Cl. 179—18)

Figure 1:
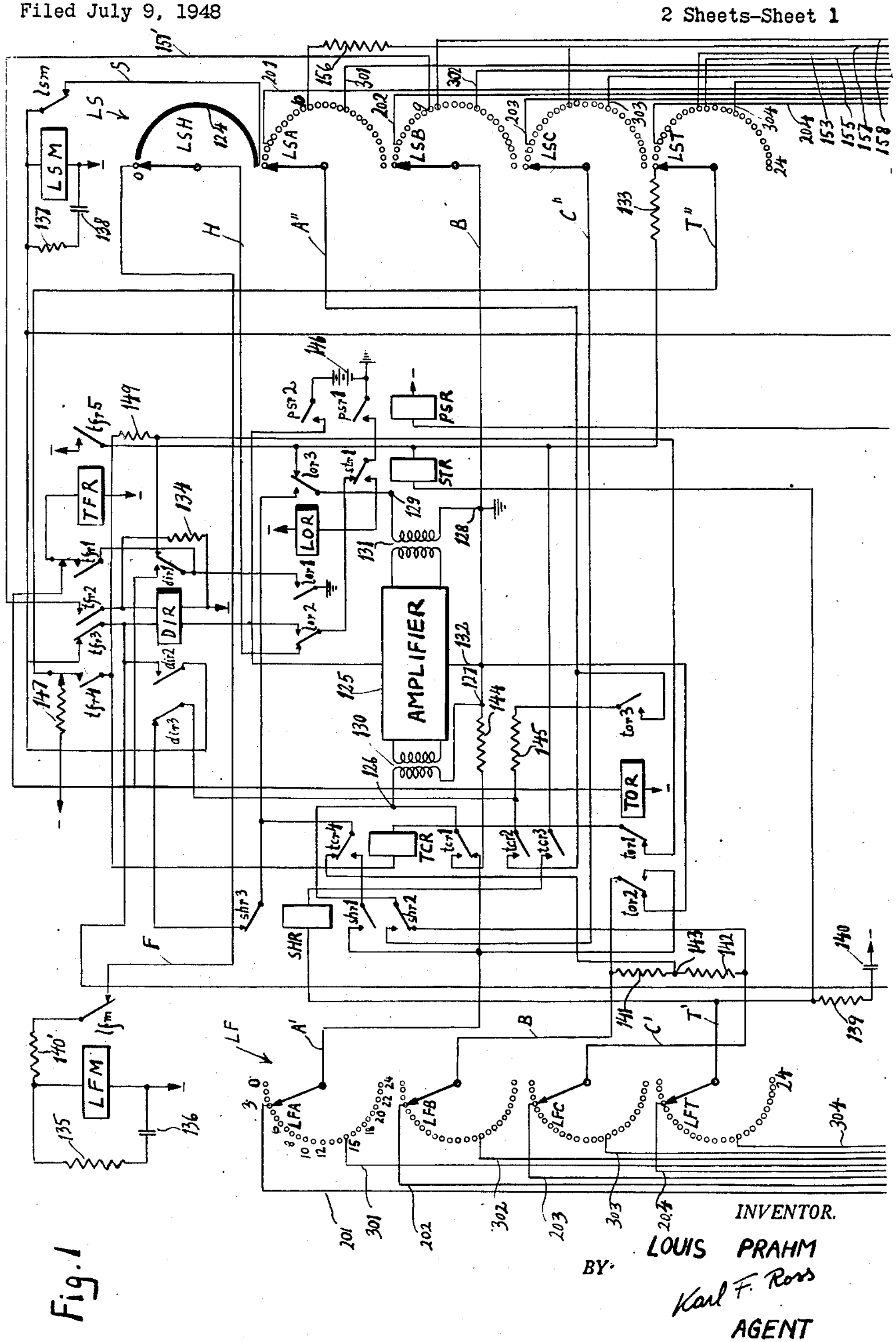

The present invention relates to two-way communication systems such as may be used, for example, between the various departments of a large office or plant, and more particularly (though not exclusively) to such systems wherein a single transducer such as a dynamic loudspeaker is provided at each station to serve both as a transmitter and as a receiver of sound waves.

An object of my invention is to provide a communication system of the character described which, over a relay system or switching arrangement comprising a minimum of parts, interconnects a large number of stations in such manner that each station will be able to call any other station of the system for two-way communication.

Another object of the invention is to provide a system having the features set forth wherein the calling party retains full control of the conversation by alternately throwing his apparatus into "talking" and "listening" condition, and wherein the called party need not actuate his equipment in order to take part in the conversation.

A further object of this invention is to provide, in a system of the character described, means for temporarily blocking or disabling a particular station so that a calling party may not interrupt or listen in on a conversation going on in the room where such station is located, said blocking means being provided preferably in combination with means for advising a party at a so disabled station that a caller is attempting to get through.

Still another object of the present invention is to provide, in a system of the character described, means operative under certain conditions for putting through a rapid or emergency call from one station of the system to another which is then engaged in communication with a third.

Yet a further object of the invention is to provide, in a system of the character described, means for simultaneously interconnecting a calling station with a group of called stations, e. g. for the purpose of paging or tracing a person whose whereabouts within the plant or office are unknown at the moment.

An embodiment of the invention utilizes an automatic telephone exchange wherein a connection between a calling and a called station is established by way of a selector-finder circuit, preferably under the control of a dial; it will be understood, however, that signaling means other than a dial may be used and that the exchange may be dispensed with, the necessary relays being then provided at the individual stations so as to be directly energizable over circuits interconnecting the stations directly; the latter arrangement will be convenient particularly where the number of stations in the system is limited.

According to another feature of the invention, group call may be effected by dialing a particular digit or series of digits whereupon further groups of stations may be successively brought into communication with the calling station by simply dialing additional digits.

Figure 2:
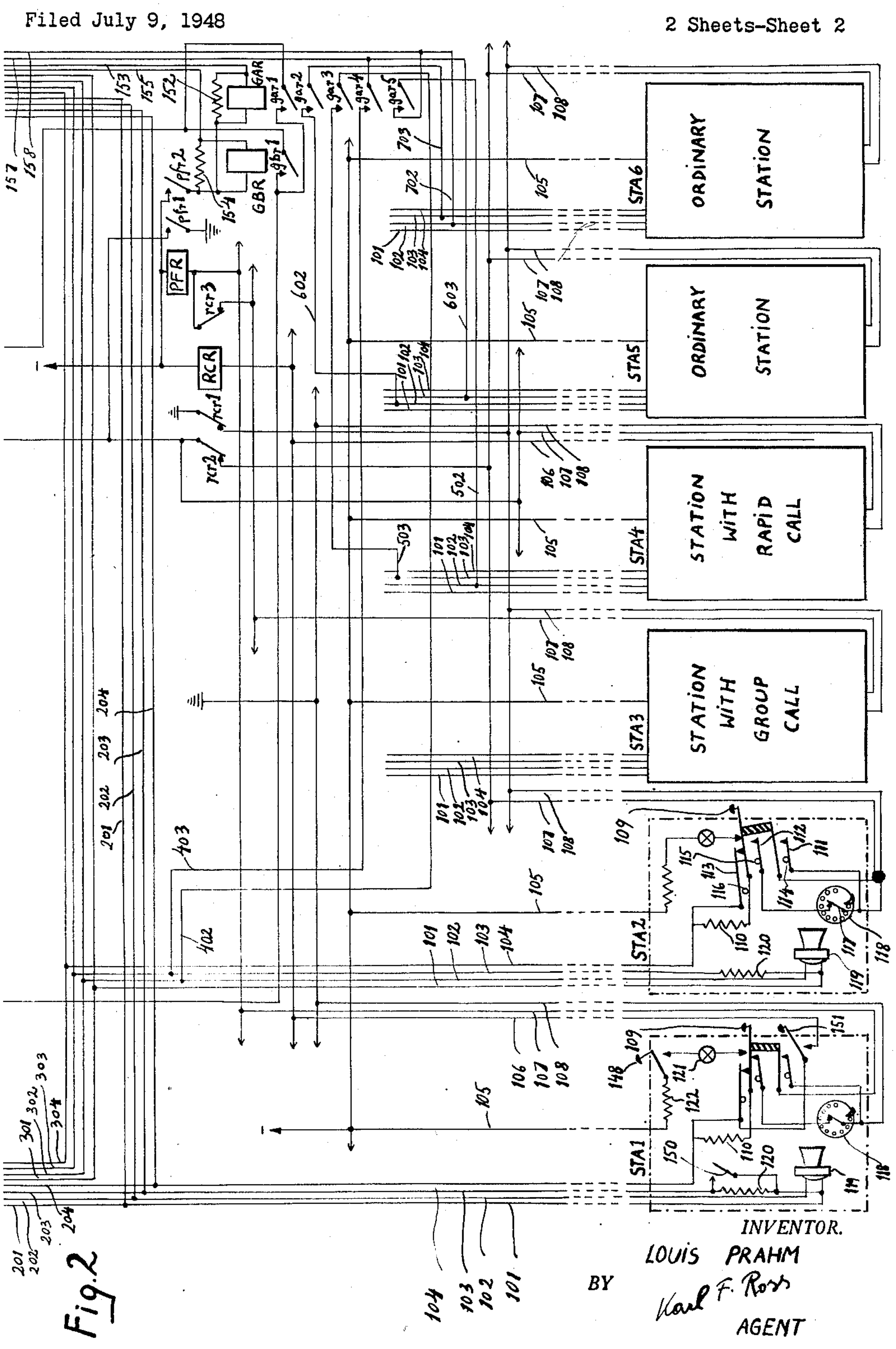

The above and other objects and features of the present invention will become apparent from the following description of a preferred embodiment, reference being had to the accompanying drawing in which:

Fig. 1 is a circuit diagram showing the principal parts of an exchange used in a system according to the invention; and Fig. 2 (which is to be placed immediately below Fig. 1) is a circuit diagram showing further and optional parts of the exchange as well as six stations connected thereto.

The stations are indicated at STA1, STA2, STA3, STA4, STA5 and STA6, respectively, and are connected to the exchange by wires 101, 102, 103, 104, 105, 106, 107 and 108. Wire 106 is provided only on stations STA1 and STA4 which are equipped with rapid call means as more fully described hereinafter.

For the present only the parts common to all stations will be referred to.

Each station has a talking key 109 which is of the double-pole type its lower arm being connected to wire 107. Key 109 cooperates with three contact springs 111, 112 and 113, springs 111 and 112 abutting respective stops 114, 115 when the key is in its normal or "up" position as shown at station STA2. The upper arm of the key is connected to wire 104 by way of a resistor 110. Key 109 also has a horizontal position, shown at station STA1, and a "down" position, not shown, in which its lower and upper arm rest upon stops 114 and 115, respectively. Spring 113 is prevented by a stop 116 from following the upper arm of key 109 when the latter is moved into the last-mentioned position.

Both springs 111 and 112 are connected to the wire 108, the latter spring by way of the normally closed contacts 117 of the conventional dial 118. Spring 113 is connected to wire 104 and shunts the resistor 110 when the key 109 is in either of the two positions shown in the drawing.

The transducer (loudspeaker-microphone) 119 is connected across the wires 101 and 102, wire 101 being connected to wire 103 by a resistor 120. An indicator lamp 121 in series with a resistor 122 is connected between wire 105 and a contact which in the normal position of key 109 is engaged by the upper arm of the latter.

At the exchange (Fig. 1) there is provided a line finder LF, having a magnet LFM and four banks LFA, LFB, LFC and LFT, as well as a line selector LS having a magnet LSM and five banks LSA, LSB, LSC, LST and LSH. Each bank has twenty-five contacts, numbered 0 through 24, but the contacts 1 through 24 of the homing bank LSH of line selector LS are combined into a single conductor 124. Wires 101, 102, 103 and 104 of station STA1 are connected to the number 3 bank contacts of both A, B, C and T banks, respectively, by way of conductors 201, 202, 203 and 204, respectively. Similarly, the wires 101, 102, 103 and 104 of station STA2 are connected to the number 15 bank contacts of the said banks, respectively, by way of conductors 301, 302, 303 and 304, respectively. The corresponding wires of the remaining stations are connected in analogous manner to different bank contacts of the two switches LF, LS, the connections therefor having, however, been omitted in order not to obscure the drawing. The number 9, number 10 and number 11 bank contacts (of which the latter two are reserved for group calls) do not have any stations individually connected thereto.

At the exchange there is further provided an amplifier 125 having input terminals 126, 127 and output terminals 128, 129. Terminals 126, 127 are the ends of the primary of an input transformer 130 while terminals 128, 129 are the ends of the secondary of an output transformer 131. Terminals 127 and 128 are on the grounded conductor B which leads from the wiper of bank LSB to the cathode lead 132 of amplifier 125 and thence, over back contact and armature *tor*2 of a tone relay TOR, to the wiper of bank LFB. Conductor A'' connects the wiper of bank LSA to terminal 129 by way of a front contact and armature *tcr*2 of a through-connecting relay TCR, back contact and armature *dir*3 of a digit relay DIR, back contact and armature *shr*3 of a shifting relay SHR, and front contact and armature *lor*3 of a line opening relay LOR. The companion conductor A' connects the wiper of bank LFA to input terminal 126 by way of back contact and armature *tcr*1 of relay TCR. Conductor C' connects the wiper of bank LFC to the terminal 126 by way of back contact and armature *shr*2 of relay SHR while its companion conductor C'' connects the wiper of bank LSC to the same terminal over the same armature *shr*2 and a front contact associated therewith. The wiper of the test bank LFT is connected by conductor T' to the winding of a stepping relay STR, thence over a resistor 133 to the home contact of bank LST, the winding of relay SHR being connected in parallel with that of relay STR by way of front contact and armature *tcr*3 of relay TCR. The other test conductor T'' leads from the wiper of bank LST to the make-before-break spring of armature *tfr*4 of a transfer relay TFR and thence over a back contact thereof and a resistor 147 to negative battery. Homing conductor H connects the wiper of bank LSH to ground over back contact and armature *lor*2 of relay LOR, back contact and armature *str*1 of relay STR, and front contact and armature *psr*1 of a power supply relay PSR.

Relays TOR, LOR and DIR are slow-releasing as shown, the delayed release of the last-mentioned relay being caused by the resistor 134 shunting one of its two windings (not shown). The windings of magnets LFM and LSM as well as of relay STR (and, with it, relay SHR) are shunted by respective spark quenching circuits comprising resistor 135 in series with condenser 136, resistor 137 in series with condenser 138, and resistor 139 in series with condenser 140. The energizing circuit for LFM leads over a resistor 140', self-interrupter contacts *lfm* and conductor F to the home contact 0 of bank LSH while the energizing circuit for LSM leads over self-interrupter contacts *lsm* and conductor S to the homing arc 124 of the same bank.

A voltage divider, consisting of the two series resistors 141, 142 having a common terminal 143, is connected between the conductors B and C'. A damping resistor 144 is connectable across the primary of input transformer 130 by way of front contact and armature *tcr*1 of relay TCR. A further resistor 145 is connected between the armatures *tcr*2 and *tor*3.

The operation of the circuits so far described is as follows:

Let us assume that a caller at station STA2 desires to communicate with a party at station STA1. The caller depresses his talking key 109 into horizontal position, which closes a circuit for relay PSR from negative, winding of that relay, armature *rcr*2 and back contact of rapid call relay RCR (subsequently referred to), wire 107, lower arm of key 109, spring 111, wire 108 to ground on the back contact of armature *rcr*1. Relay PSR energizes and at *psr*2 connects the amplifier 125 to its power supply shown here schematically as a battery 146. Simultaneously, a circuit is closed for selector magnet LSM which, it will be assumed, is in off-normal position: Negative, winding LSM, contacts *lsm*, conductor S, arc 124, wiper of LSH, conductor H, back contact and armature *lor*2, back contact and armature *str*1, front contact and armature *psr*1 to ground. Switch LS thereupon homes to position 0 in which the last-mentioned circuit is broken at the wiper of LSH, the latter thereupon completing a circuit for magnet LFM from negative, winding LFM, resistor 140, contacts *lfm*, conductor F, home contact 0 and wiper of LSH, conductor H, back contact and armature *lor*2, back contact and armature *str*1, front contact and armature *psr*1 to ground.

Finder LF, which has no home position, thereupon steps to position 15 which marks the calling station STA2. In this position a circuit for relay STR is closed from negative, resistor 147, back contact and make-before-break spring of armature *tfr*4, conductor T'', wiper and home contact of bank LST, resistor 133, winding STR, conductor T', wiper of bank LFT in position 15, wire 304, wire 104 of station STA2, spring 113, upper arm of key 109, spring 112, contacts 117, wire 108, back contact and armature *rcr*1 to ground. The circuit for finder magnet LFM is now broken at *str*1 which armature now closes a circuit for the line opening relay LOR: From negative, winding of LOR, front contact and armature *str*1, front contact and armature *psr*1 to ground.

LOR operates, connecting output terminal 129 to input terminal 126 by way of armature *lor*3 and front contact thereof, armature *tcr*4 and back contact, junction 143, low resistor 142 of the voltage divider 141, 142, back contact and armature *shr2*. The output transformer 131 is now connected across the input transformer 130, thereby closing a feedback circuit for amplifier 125 which, under the control of a suitably tuned circuit (not shown), oscillates at an audio frequency which produces a dial tone in the transducer 119 of station STA2; the circuit for transducer 119 may be traced from grounded terminal 127, back contact and armature *tor2*, conductor B, wiper of LFB in position 15, wire 302, wire 102, wire 101, wire 301, wiper of LFA in position 15, conductor A', back contact and armature *tcr1* to terminal 126.

The caller, on hearing the dial tone, dials the desired station STA1 whose call number is three. Dial 118 opens its contacts 117 three times. On the first break of the dialing circuit, relay STR releases and closes an energizing circuit for digit relay DIR and selector magnet LSM in series, from negative, winding LSM, back contact and armature *tfr3*, left-hand winding of DIR, front contact and armature *lor2*, back contact and armature *str1*, front contact and armature *psr1* to ground. Operation of DIR closes circuit for the transfer relay TFR from negative, winding TFR, make-before-break spring and back contact of armature *tfr1*, front contact and armature *dir1*, front contact and armature *lor1* to ground. Relay TFR locks independently of DIR over its front contact and armature *tfr1*. Relay TFR, in attracting its armature *tfr5*, transfers the operating circuit of STR from the home contact of LST to negative battery connected to the front contact of armature *tfr5*. Tone relay TOR also operates: Negative, winding TOR, front contact and armature *dir1*, front contact and armature *lor1*, ground. Relay DIR and magnet LSM had locked over *dir2* before their original operating circuit was opened at *tfr3*.

The operation of relay TOR breaks the circuit to transducer 119 and the dial tone stops. Relays LOR, DIR and TOR, being slow-releasing, remain energized during dialing. After the first dialing impulse relay STR is re-operated over *tfr5* and releases LSM whereby the selector switch LS will take one step forward. When the dial 118 returns to normal, the selector will have taken three steps and its wipers will stand on the No. 3 contacts of their respective banks.

After an interval, relay DIR releases and connects the transducer 119 of the called station STA1 across the output of amplifier 125 whose feedback circuit is still closed, the circuit for the transducer being traceable from grounded output terminal 128, conductor B, wiper of LSB in position 3, wire 202, wire 102 of station STA1, wire 101, wire 201, wiper of LSA in position 3, conductor A'', front contact and armature *tor3*, resistor 145, armature *dir3* and back contact thereof, back contact and armature *shr3*, front contact and armature *lor3* to terminal 129. A short warning tone is now sounded at station STA1 which ceases upon the release of relay TOR, the latter occurring a predetermined time after the release of relay DIR.

It will be noted that the called station STA1 has been shown provided with a special blocking key 148, connected between the resistor 122 and the warning lamp 121. This key serves as a means for so disabling the station that talking communication cannot be established with a calling station, this being one of the optional features of the invention. Such a key may be provided, for example, at stations located in the offices of certain executives whereas the stations of the subordinates will not generally be so equipped. If a key 148 is provided and is left open as shown in the drawing, release of relay TOR will result in the reconnection of the calling transducer across the terminals 126, 127 of amplifier 125, so that the caller will again hear the dial tone.

Let us assume, however, that the key 148 had been placed in closed position, or that the called party upon hearing the warning tone immediately actuates the key to receive the message. A circuit for through-connecting relay TCR is then closed from negative, resistor 122, key 148, lamp 121, upper arm of key 109 in its normal ("up") position, spring 113, wire 104, wire 204, wiper of LST in position 3, conductor T'', front contact and armature *tfr4*, winding TCR, armature *tor1* and back contact thereof, back contact and armature *dir1*, front contact and armature *lor1* to ground. The winding of TCR is shunted by a resistor 149 which causes the lamp 121 to light even before relay TOR completes the circuit for TCR at *tor1*. Relay TCR at *tcr3* connects the winding of relay SHR in parallel with that of the relay STR, causing the operation of relay SHR. The feedback circuit of amplifier 125 is now broken at *tcr4* and *shr2*; input terminal 126 is now connected to transducer wire 103 of called station STA1 over armature *shr2* and front contact thereof, conductor C'', wiper of LSC in position 3, wire 203, while simultaneously the output terminal 129 is connected to transducer wire 101 of calling station STA2 over armature *lor3* and front contact thereof, armature *tcr4* and front contact thereof, armature *shr1* and front contact thereof, conductor A', wiper of LFA in position 15, conductor 301. At the same time the B conductor will serve to connect the grounded terminals 127, 128 to the 102 wires of both stations. It will thus be seen that the secondary of output transformer 131 and the primary of input transformer 130 have been connected across the transducers of the calling and the called station, respectively, so that the caller at station STA2 may hear any sound that reaches the microphone at station STA1.

At this stage, however, the caller will generally desire to transmit some message or inquiry to the called station and, for this purpose, actuates the key 109 of his apparatus into "down" position. This operation leaves the circuits unaffected, except that the short circuit across resistor 110 is now broken at spring 113 whereby this resistor is connected in series with the windings of relays STR and SHR. The winding of shifting relay SHR is arranged so that this relay will release under these conditions, whereupon input transformer 130 will be connected across the transducer of station STA2 and output transformer 131 will be connected across the transducer of station STA1. The circuit for transformer 130 may be traced from terminal 126, armature *shr2* and back contact thereof, conductor C', wiper of LFC in position 15, wire 303 to wire 103 of station STA2; that for transformer 131 from terminal 129, armature *lor3* and front contact thereof, armature *shr3* and back contact thereof, back contact and armature *dir3*, armature *tcr2* and front contact thereof, conductor A'', wiper of LSA in position 3, wire 201 to wire 101 of station STA1. It will be noted that relay TCR at *tcr1* connects damping resistor 144 across the primary of input transformer 130 whenever the system is in condition for conversation in one direction or the other. The calling party (at station STA2)

retains control of the conversation throughout the existence of the connection set up in the manner described, by manipulating his key 109 between horizontal and "down" position whereby the conversation may go either from the calling to the called station or vice versa. After the caller restores key 109 to its normal "up" position, all relays release and the circuits return to normal. It will be noted that the connection between input terminal 126 and transducer 119 always leads over wire 103 with resistor 120 in series, whereas that between output terminal 129 and the transducer leads directly over wire 101. The provision of resistor 120 serves for the purpose of attenuating noises originating at the talking station whereas no attenuating means is provided between the output of amplifier 125 and the transducer of the listening station. The resistor 120 may, however, be short-circuited by means of a switch 150, as in the case where a particular station (e. g. STA1) is disposed in a relatively quiet locality.

It will be appreciated that the attenuating resistor 120 may be provided in the exchange rather than in the several stations, in which case the multiple interconnecting each station with the exchange need not include a wire 103.

Let us assume, now, that station STA2 is engaged in a conversation with another station, say STA6, and that a caller at station STA1 desires to put through an emergency call to station STA2. Station STA1 is provided with rapid call as well as with group call facilities, as more fully described hereinafter, and because of the latter feature has its wire 107 connected to the winding of a preference relay PFR, rather than to that of relay PSR as is the case with stations STA2, STA4, STA5 and STA6 which are without group call. When the party at station STA1 actuates his key 109 into horizontal position, relay PFR energizes over a circuit leading from negative over its wiring, wire 107, lower arm of key 109, wire 108 to ground, and at *pfr1* closes an energizing circuit for PSR which, however, is already operated by way of the talking key of station STA2 and armature *rcr2* of rapid-call relay RCR. Since the operating circuit for magnet LSM will under these conditions be broken at *lor2*, the caller at station STA1 will get no dial tone, indicating that station STA2 is busy.

If station STA1 were an ordinary station, the caller thereat could either wait with the key 109 in horizontal position until the reception of dial tone indicates the dissolution of the prior connection by station STA2, or restore the key to normal and try again after a suitable interval to reach the desired party. Restoration of the key 109 should be effected before the calling party leaves the room or in some other manner abandons the call, in order that the system be not blocked for other parties.

Station STA1 has, however, been shown as one of a limited number of preferred stations adapted for rapid call, another such station being station STA4. Station STA1 is accordingly equipped with a button or switch 151 whose actuation to close its contacts will energize relay RCR over the following circuit: Negative, winding RCR, wire 106, switch 151, spring 113, upper arm of key 109, spring 112, closed contacts 117, wire 108, ground. Relay RCR energizes and at *rcr1* opens the energizing circuit for relay STR by removing ground from wire 108 of station STA2, at the same time opening its contacts at armature *rcr2* in order to prevent the grounding of said wire 108 by way of front contact and armature *pfr1*. Relay PSR remains energized over *pfr1*. Relay STR on releasing breaks the energizing circuit for relay LOR, the latter upon its delayed release closing the aforedescribed homing circuit for line selector LS. When the caller at station STA1 hears the dial tone, he releases switch 151 and starts dialing the number of the desired station STA2. Since station STA2 corresponds to position 15 on the finder and selector switches, its number cannot be dialed directly with the ordinary dial whose digits range from 1 through 0. Station STA2 may, however, be reached by dialing digits 9 and 6 in succession, digit 9 corresponding to a hold-over position at which no connections to other stations are established and relay DIR is held energized over its right-hand winding, armature *tfr2* and front contact thereof, a conductor 151′, contact 9 of bank LSB, wiper of LSB, grounded conductor B.

The hold-over digit 9 also serves for the initiation of group calls for which, in the embodiment illustrated, positions 10 and 11 are utilized. Position 10 may be reached by dialing either 0 or 91 and results in the energization of a first group relay GAR in a circuit from negative, front contact and armature *pfr2* (relay PFR being operated since group call must be initiated from a specially equipped station such as STA1 or STA3 adapted upon actuation of its key 109 to result in the energization of preference relay PFR), winding or relay GAR shunted by a resistor 152, a conductor 153, contact 10 of bank LST, wiper of LST conductor T″, front contact and armature *tfr4*, resistor 149 in parallel with winding TCR, back contact and armature *dir1*, front contact and armature *lor1* to ground. A similar circuit will be closed for a second group relay GBR in position 11 of selector switch LS, this circuit including, however, a resistor 154 and a wire 155 in lieu of resistor 152 and wire 153. In the following, operation of only the first group relay GAR will be described in detail.

Relay TCR operates in series with relay GAR whereupon the input transformer 130 is connected across the transducers 119 of four stations STA2, STA4, STA5 and STA6 as follows: Terminal 126; armature *shr2* and front contact thereof; conductor C″; wiper of LSC in position 10; contact 10 of LSC; wire 157; armature *gar4* and front contact thereof; wire 403; wire 103, resistor 120, wire 101, transducer 119, wire 102 of STA2; wire 402; armature *gar3* and front contact thereof; wire 503; wire 103, resistor 120, wire 101, transducer 119, wire 102 of STA4; wire 502; armature *gar5* and front contact thereof; wire 158; contact 10 of bank LSB; wiper of LSB; conductor B to grounded terminal 127; and in parallel therewith from wire 157; wire 603; wire 103, resistor 120, wire 101, transducer 119, wire 102 of STA5; wire 602; front contact and armature *gar2*; wire 703; wire 103, resistor 120, wire 101, transducer 119, wire 102 of STA6; wire 702 to wire 158: It will thus be seen that the four stations controlled by relay GAR have been interconnected in two parallel circuits each comprising two series-connected transducers.

When relay SHR releases in the manner previously described, the input transformer 130 is replaced by the output transformer 131 over a circuit which leads from terminal 129 over armature *lor3* and front contact thereof, armature *shr3* and back contact thereof, back contact and armature *dir3*, armature *tcr2* and front contact thereof, conductor A″, wiper of LSA and bank contact 10 thereof, resistor 156 to wire 157 and back from wire 158, contact 10 of LSB and wiper thereof, conductor B to grounded terminal 128.

It will thus be seen that the provision of group relay GAR enables a caller at station STA1 (or at similarly equipped station STA3) to communicate simultaneously with a plurality of other stations, in the present case four, which facility may be conveniently utilized for the purpose of tracing or paging a person assumed to be within reach of any of the several stations thus selected. If the desired party is not at one of these stations, the caller may communicate with a further group of stations (not shown) by energizing relay GBR; this may be accomplished by dialing digit 1, relay GAR having short-circuited back contact and armature *tfr3* over its own front contact and armature *gar1* so that relay DIR will again be operated when relay STR releases. Relay GBR, when operated, closes at its armature *gbr1* a similar short circuit permitting the selection of further group relays (not shown).

From the foregoing description it will be apparent that, in order to simplify the circuits, group call can only be initiated from specially equipped stations such as STA1 and STA3 to stations not so equipped, the special equipment being characterized in this that a preference relay PFR, which energizes power supply relay PSR while at the same time preparing an operating circuit for group relays such as GAR and GBR, responds to the actuation of the talking key of such stations. Similarly, rapid call can only be initiated from stations such as STA1 and STA4 equipped with a special button or switch 151, for the purpose of breaking a connection established by a station unprovided with such a switch, operation of the latter energizing a relay RCR which opens the energizing circuit for relay PSR, in the case of stations equipped with neither rapid call nor group call facilities, and for relay PFR in the case of stations equipped with group call facilities only (station STA3); relay RCR also disconnects ground from wire 108 of all stations not themselves adapted to initiate rapid-call operation.

Although I have specifically described and illustrated a single, now preferred embodiment of my invention, it will be understood that the same is subject to alterations, modifications and adaptations without departing from the spirit or exceeding the scope of the invention. By way of example it may be mentioned that the finder and selector switches referred to above may be replaced by other switching means well known per se, such as chains of counting relays, and that push buttons may be substituted for the dials shown, for instance in systems comprising a small number (say eight) of stations associated with a common amplifier but interconnected without the intermediary of a selector-finder circuit or its equivalent. Many other changes will undoubtedly occur to those skilled in the art without distinguishing inventively from the communication system herein disclosed and claimed.

I claim:

1. A communication system comprising a plurality of stations, an exchange common to all of said stations, a key at each station having three positions including a normal, a listening and a talking position, electro-acoustic transducer means at each station, line connecting means at said exchange, switch means operable in one of the two last mentioned positions of said key of any one station to seize said line connecting means, signaling means at each station for controlling said seized line connecting means to establish a connection between a calling station and a desired station, amplifier means at said exchange, circuit means operative in the listening position of said key at said calling station and in the normal position of said key at said desired station for connecting the output and the input of said amplifier means to said transducer means at said calling station and said desired station, respectively, whereby a talking circuit for conversation from said desired station to said calling station is established, and key-controlled relay means at the exchange operative in the talking positions of said key at said calling station and in the normal position of said key at said desired station for connecting the input and the output of said amplifier means to said transducer means at said calling station and at said desired station, respectively, whereby a talking circuit for conversation from said calling station to said desired station is established, said circuit means comprising a first relay connected to be energized in both the listening and the talking positions of said key at said calling station, said key-controlled relay means comprising a second relay connected in parallel with said first relay, said circuit means further including a resistor connected in series with both of said relays and of such magnitude as to prevent operation of said second relay in series therewith, said key being arranged to short-circuit said resistor in one of said two last-mentioned positions whereby said second relay will be energized.

2. The communication system according to claim 1 wherein said first relay is a stepping relay connected to be momentarily released by said signaling means for controlling said selector means in response to impulses from said signaling means.

3. A communication system comprising a plurality of stations, an exchange common to all of said stations, a key at each station having three positions including a normal, a listening and a talking position, electro-acoustic transducer means at each station, line connecting means at said exchange, switch means operable in one of the two last mentioned positions of said key of any one station to seize said line connecting means, signaling means at each station for controlling said seized line connecting means to establish a connection between a calling station and a desired station, amplifier means at said exchange, circuit means operative in the listening position of said key at said calling station and in the normal position of said key at said desired station for connecting the output and the input of said amplifier means to said transducer means at said calling station and said desired station, respectively, whereby a talking circuit for conversation from said desired station to said calling station is established, and key-controlled relay means at the exchange operative in the talking positions of said key at said calling station and in the normal position of said key at said desired station for connecting the input and the output of said amplifier means to said transducer means at said calling station and at said desired station, respectively, whereby a talking circuit for conversation from said calling station to said desired station is established, said line connecting means including a finder switch and a selector switch, a homing circuit for said selector switch, said homing circuit including contacts closed in both of said last-mentioned positions of said key, a stepping circuit for said finder switch including contacts closed in the home position of said selector switch, a stepping relay operative to arrest said finder switch in a position corresponding to the calling station, and means including said stepping relay for advancing said selector switch under the control of impulses from said signaling means.

4. The communication system according to claim 3 wherein said signaling means comprises a telephone dial.

5. A communication system comprising a plurality of stations, an exchange common to all of said stations, a key at each station having three positions including a normal, a listening and a talking position, electro-acoustic transducer means at each station, line connecting means at said exchange, switch means operable in one of the two last-mentioned positions of said key of any one station to seize said line connecting means, signaling means at each station for controlling said seized line connecting means to establish a connection between a calling station and a desired station, amplifier means at said exchange, circuit means operative in the listening position of said key at said calling station and in the normal position of said key at said desired station for connecting the output and the input of said amplifier means to said transducer means at said calling station and said desired station, respectively, whereby a talking circuit for conversation from said desired station to said calling station is established, and key-controlled relay means at the exchange operative in the talking positions of said key at said calling station and in the normal position of said key at said desired station for connecting the input and the output of said amplifier means to said transducer means at said calling station and at said desired station, respectively, whereby a talking circuit for conversation from said calling station to said desired station is established, said exchange comprising line finder means arranged to be arrested in a position corresponding to a calling station, a normally open feedback circuit for rendering said amplifier means oscillatory, and relay means operative upon arrestation of said line finder means for closing said feedback circuit while connecting the output of said amplifier means to the transducer means of said calling station.

6. The communication system according to claim 5 wherein said exchange comprises relay means adapted, upon arrestation of said selector means in a position corresponding to a desired station, to connect the output of said amplifier means to the transducer means of said desired station for a predetermined period, whereby a warning tone will be emitted by the last-mentioned transducer means.

7. The communication system according to claim 6 wherein the last-mentioned relay means include a first slow releasing relay adapted to be operated during impulses from said signaling means and a second slow-releasing relay arranged to release a short time after the release of the first slow-releasing relay.

8. In a communication system, in combination, a plurality of stations including a first, a second and a third station, an exchange common to all of said stations, selector means at said exchange, circuit means operable from any one of said stations for seizing said selector means and controlling the same to establish a connection with any other of said stations, relay means at the exchange operable to break a connection established between said first and second stations, and switch means at said third station for operating said relay means.

9. In a communication system, in combination, a plurality of stations including a first, a second and a third station, an exchange common to all of said stations, line connecting means at said exchange, circuit means operable from any one of said stations for seizing said line connecting means and controlling the same to establish a connection with any other of said stations, said circuit means being thus operable to establish a connection between said first and second stations, relay means at the exchange operable to break said connection established between said first and second stations, and switch means at said third station for operating said relay means, said line connecting means including a stepping relay and an energizing circuit for said stepping relay, said circuit means including an actuating key provided at each of said stations and a plurality of control wires respectively leading from said stations to the exchange, said stepping relay under the control of said circuit selectively associating said line connecting means with any one of said stations, said relay means having contacts in series with said control wires from said first and second stations but not in series with said control wire from said third station, said contacts when open breaking the connection between said first and second stations.

10. In a communication system, in combination, a first and a second group of stations, an exchange common to all of said stations, line connecting means including a selector switch at said exchange, circuit means operable from any one of said stations for seizing said line connecting means and controlling the same to establish a connection with any other of said stations, said selector switch being controllable by said circuit means to assume a special position, amplifier means at said exchange, said amplifier means having input and output circuits, group relay means actuatable in said special position of said selector switch for connecting said second group of stations across one of said circuits, and switching means operable from a station of said first group of stations for actuating said group relay means and connecting said station across the other of said circuits.

11. The combination according to claim 10, comprising a plurality of group relays connected to be energized in successive positions of said selector switch for connecting respective sets of said second group of stations to said amplifier, each preceding group relay being adapted to prepare an operating circuit for said line connecting means whereby a succeeding group relay may be selected.

12. In a communication system, in combination, a plurality of stations including at least one calling and at least one called station, circuit means controllable from said calling station for establishing a talking connection between said calling and called stations, a loudspeaker at said called station, a microphone at said calling station, and signal generator means producing an audible signal, said circuit means including a timing circuit which, upon establishing said connection, connects said loudspeaker to said signal generator means for a predetermined time interval thereby transmitting said audible signal to said called station, and immediately thereafter connects said loudspeaker to said microphone at the calling station, thereby enabling voice transmission from said calling to said called station.

13. The combination according to claim 12 wherein said called station comprises a switch operable to prevent the connection of said loudspeaker to said microphone, said switch being ineffective to prevent the connection of said loudspeaker to said signal generator means.

LOUIS PRAHM.

REFERENCES CITED

The following references are of record in the file of this patent:

UNITED STATES PATENTS

| Number | Name | Date |
|---|---|---|
| 1,586,308 | Homrighous | May 25, 1926 |
| 1,956,610 | Belas | May 1, 1934 |
| 1,975,932 | Fox | Oct. 9, 1934 |
| 2,141,476 | Lomax | Dec. 27, 1938 |
| 2,157,140 | Molin | May 9, 1939 |
| 2,162,370 | Campbell | June 13, 1939 |
| 2,169,389 | Keckler | Aug. 15, 1939 |